US010872090B2

(12) United States Patent
Rosen et al.

(10) Patent No.: US 10,872,090 B2
(45) Date of Patent: Dec. 22, 2020

(54) GENERATING TEST DATA BASED ON DATA VALUE RULES OF LINKED DATA NODES

(71) Applicant: MASTERCARD INTERNATIONAL INCORPORATED, Purchase, NY (US)

(72) Inventors: Brett Rosen, St. Charles, MO (US); Dan Carmody, Chesterfield, MO (US); Stephen Dietz, Wicklow (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 211 days.

(21) Appl. No.: 16/133,881

(22) Filed: Sep. 18, 2018

(65) Prior Publication Data

US 2020/0089797 A1 Mar. 19, 2020

(51) Int. Cl.
*G06F 16/901* (2019.01)
*G06F 16/2458* (2019.01)
*G06F 11/34* (2006.01)
*G06F 16/22* (2019.01)

(52) U.S. Cl.
CPC ...... *G06F 16/2462* (2019.01); *G06F 11/3495* (2013.01); *G06F 16/2246* (2019.01); *G06F 16/9024* (2019.01)

(58) Field of Classification Search
CPC ............. G06F 16/2462; G06F 16/2246; G06F 16/9024; G06F 11/3495
See application file for complete search history.

(56) References Cited

U.S. PATENT DOCUMENTS

| 2005/0267902 | A1* | 12/2005 | Thurnhofer | G06F 16/2246 |
| 2008/0071825 | A1* | 3/2008 | Guo | G06F 16/48 |
| 2009/0019067 | A1* | 1/2009 | Furusho | G06F 16/2246 |
| 2011/0131220 | A1* | 6/2011 | Williamson | G06F 16/83 707/755 |
| 2015/0278258 | A1* | 10/2015 | Kienzle | G06F 16/215 707/692 |

(Continued)

OTHER PUBLICATIONS

Unknown, Wikipedia, "Random Testing", https://en.wikipedia.org/wiki/Random_testing, captured Mar. 6, 2018, pp. 1-5.

(Continued)

*Primary Examiner* — Jay A Morrison
*Assistant Examiner* — Antonio J Caiado

(57) ABSTRACT

The disclosure herein describes generating test data based on a set of linked data nodes and associated data value rules. A plurality of data fields of a data structure is identified. A plurality of linked data nodes is generated based on the identified data fields, wherein each data node comprises a probability value and data value rules for generating data values for the data fields. Parent nodes of the linked data nodes are collapsed into associated child nodes to form combined data nodes. Test data values for the plurality of data fields are generated based on the combined data nodes and a data structure instance is populated with the generated test data values. The populated data structure instance is provided for use in executing tests. The generation of test data based on the data value rules of linked data nodes provides a realistic data environment for testing.

20 Claims, 5 Drawing Sheets

(56) References Cited

U.S. PATENT DOCUMENTS

| | | | |
|---|---|---|---|
| 2017/0053294 A1* | 2/2017 | Yang | G06F 16/9024 |
| 2019/0236415 A1* | 8/2019 | Pyko | G06K 9/6282 |
| 2019/0294633 A1* | 9/2019 | Dembo | G06F 16/9024 |

OTHER PUBLICATIONS

Unknown, "Randon Software Testing Techniques", http://extremesoftwaretesting.com/Techniques/RandomTesting.html, captured Mar. 6, 2018, pp. 1-5.

* cited by examiner

US 10,872,090 B2

1

GENERATING TEST DATA BASED ON DATA VALUE RULES OF LINKED DATA NODES

BACKGROUND

Development of data processing software benefits greatly from testing with data that resembles real data with which the data processing software will be used. However, in some cases, using real data is not practical and/or not possible due to regulations, privacy concerns, or the like. Generating test data randomly or pseudo-randomly is possible, but randomly generated data is not likely to exhibit structural patterns or other unique aspects of a set of real data. Testing software against inaccurate test data may yield inaccurate test results, such that the tests fail to identify problems that may exist with the software when used with accurate test data sets and, later, the associated real data sets.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method and system for generating test data based on a set of linked data nodes is described. A plurality of data fields of a data structure is identified. A plurality of linked data nodes is generated based on the identified data fields, wherein each data node comprises a probability value and at least one data value rule for generating a data value for at least one of the plurality of data fields, and wherein each data node is at least one of a parent data node to at least one other data node of the plurality of linked data nodes or a child data node to another data node of the plurality of linked data nodes. The parent nodes of the linked data nodes are collapsed into associated child nodes to form a set of combined data nodes, wherein each combined data node includes a combined probability value based on probability values of associated parent data nodes and child data nodes and a combined data value rule set based on the at least one data value rules of the associated parent data nodes and child data nodes. Test data values for the plurality of data fields are generated based on the set of combined data nodes and a data structure instance of the data structure is populated with the generated test data values. The populated data structure instance is provided to at least one testing application.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

Aspects of the disclosure provide a system and method for generating test data based on data value rules of linked data nodes. Data fields are identified for a data structure for which test data is to be generated. Then, linked data nodes are generated based on the identified data fields. Each linked data node includes a probability value that indicates a probability that the data node will be used to generate test data and data value rules for generating test data values for the identified data fields. Further, each data node is a parent data node to at least one other data node and/or a child data node to another data node. After the data nodes are generated, the parent nodes are collapsed into associated child nodes to form a set of combined data nodes. Each combined data node includes a combined probability value based on probability values of associated parent data nodes and child data nodes, and a combined data value rule set based on the data value rules of the associated parent data nodes and child data nodes. Test data values for the identified data fields are generated based on the set of combined data nodes, and a data structure instance of the data structure is populated with the generated test data values. The populated data structure instance is provided to at least one testing application.

The described test data generation system provides developers and other users with a tool for generating custom test data that resembles a real data set that may be used with the software being tested. The test data being generated may be customized based on users' input and/or determined data patterns from an exemplary real data set. The test data reflects real distributions of different types of real data entries in a real data set based on the probability values of the linked data nodes as described herein. The processor and memory of the test data generation system operate in an unconventional way to generate the test data based on the linked and/or hierarchically arranged data nodes, enabling the creation and use of test data sets that accurate resemble the structure and content patterns of real data sets.

Figure 1:
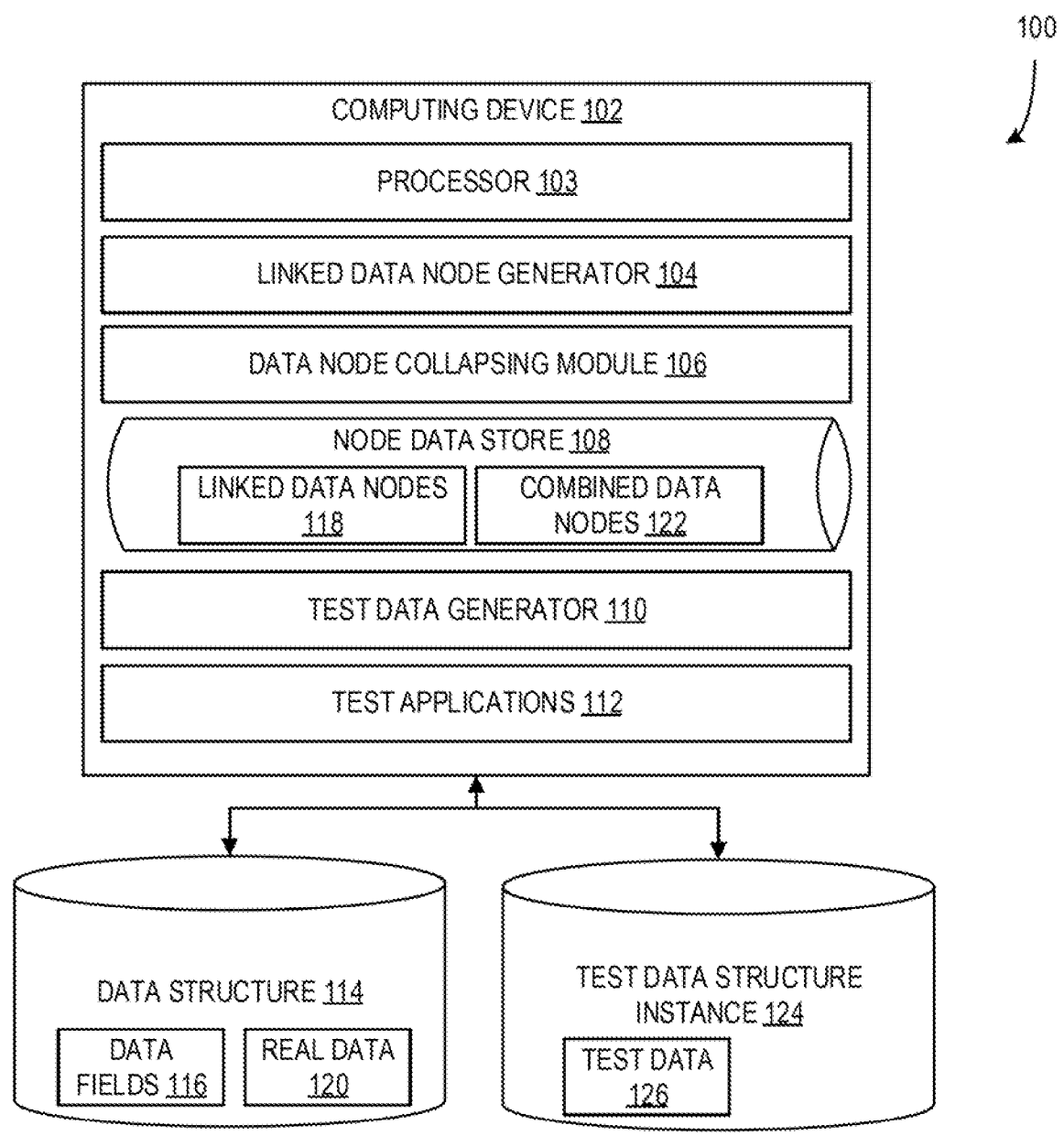
FIG. 1 is an exemplary block diagram illustrating a system configured for generating test data according to an embodiment.

FIG. 1 is an exemplary block diagram illustrating a system 100 configured for generating test data according to an embodiment. The system 100 includes a computing device 102 that includes hardware, firmware, and/or software components that configure the computing device 102 for generating test data. In some examples, the computing device 102 includes at least one processor 103, memory, a data store device or devices, and/or input/output (I/O) interfaces enabling the computing device 102 to perform the test data generation operations as described herein. While the computing device 102 is illustrated according to a specific configuration in FIG. 1, in alternative embodiments, the computing device 102 may be configured to include more, fewer, or different components in different configurations without departing from the description.

The computing device 102 includes a linked data node generator 104, a data node collapsing module 106, a node data store 108, a test data generator 110, and test applications 112. The processor 103 may be configured to perform operations associated with any of the components 104-112 of the computing device 102. The linked data node generator 104 may include hardware, firmware, and/or software components that are configured to generate the linked data nodes as described. In some examples, the linked data node generator 104 is configured to receive data fields 116 associated with a data structure 114. The linked data node generator 104 may retrieve the data fields 116 from the data structure 114 via a network interface or other communication interface of the computing device 102 in examples where the data structure 114 is accessible by the computing device 102 via a network or the like. In other examples, the data structure 114 is stored in a data store of the computing device 102 (e.g., a hard drive, disk drive, memory, etc.) and the linked data node generator 104 retrieves the data fields 116 from the data structure 114 via an associated data store interface (e.g., an interface with the hard drive, disk drive, or memory, etc.). For instance, data fields 116 and any associated rules for generation may be read from a file (e.g., a JavaScript Object Notation (JSON) file, etc.) stored on a hard disk of the computing device 102. Alternatively, or additionally, the linked data node generator 104 may be configured to receive the data fields 116 by manual user entry.

The data fields 116 define the structure of the data structure 114, including how many data values are required and/or available for a data entry, what type of data values are associated with a data entry, and/or specific names of the data values of a data entry. For instance, in a relational database or other table-based database, the data fields may be the columns of a table in the database, such that a row in the table represents a data entry in the table and each data entry may include a data value for each data field. Data fields 116 may include code data fields (e.g., numeric values indicative of a descriptor or other parameter of the data, etc.), index data fields (e.g., numeric values indicative of a link of the data entry to another data entry in another table or other data structure, etc.), other numeric data fields, string data fields (e.g., a name, term, or description associated with a data entry, etc.), date-time data fields, location data fields (e.g., a name, code, or combination thereof indicative of a location associated with the data entry, etc.), etc. The data fields 116 may further include value ranges or other limitations (e.g., numeric data fields that are limited to integer values, code data fields or string data fields that are limited to a list of possible code values or string values respectively, etc.). In some examples, some data fields may be dependent on or otherwise related to other data fields (e.g., a zip code data field or area code data field may have a limited set of possible code data values based on a state data field, etc.). Such data field dependencies and/or relationships may be defined within the data of the data fields 116 and/or they may be determined based on data patterns of real data as described below.

Figure 2A:
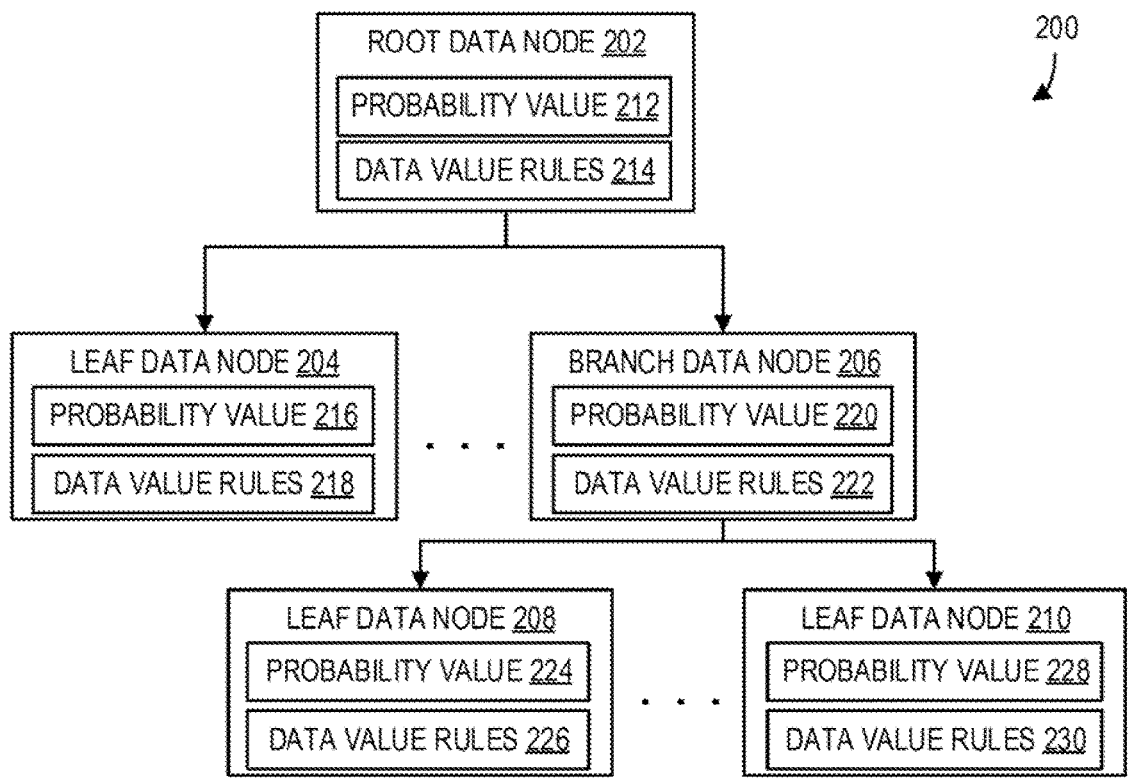
FIGS. 2A and 2B are exemplary block diagrams illustrating a tree structure of linked data nodes and a set of combined data nodes, respectively, according to an embodiment.

When the data fields 116 are received, the linked data, node generator 104 generates a set of linked data nodes 118 based on the data fields 116. The generated linked data nodes 118 may be stored in the node data store 108 as illustrated. In some examples, the linked data nodes 118 may be generated and linked in a tree structures as illustrated in FIG. 2A. Alternatively, the linked data nodes 118 may be generated and linked in other types of structures without departing from the description herein. Each linked data node 118 includes a probability value and at least one data value rule. The probability value of a linked data node 118 indicates a probability that the data value rule(s) of the linked data node 118 will be used to generate a particular test data value. A data value rule of a linked data node 118 may be associated with at least one data field 116 and, when evaluated, the data value rule may cause a defined test data value to be generated for the associated data field. For instance, a data value rule associated with a transaction type data field may cause a test data value indicating a transaction type of "grocery transaction" to be generated based on the probability value of the associated linked data node 118. In some examples where the linked data nodes 118 are linked in a tree structure as shown in FIG. 2A, the probability values and data value rules may be "inherited" by child data nodes from parent data nodes. The interactions between linked data nodes in a tree structure are described in greater detail below with respect to FIGS. 2A and 2B.

The linked data node generator 104 may generate the linked data nodes 118 based on user input that is provided based on the data fields 116. For instance, a user may manually provide probability values and data value rules for each linked data node, as well as assigning the link relationships between the linked data nodes 118. Alternatively, or additionally, the linked data node generator 104 may access real data 120 from the data structure 114 and/or other associated data structures in order to determine data value patterns therein. The linked data node generator 104 may generate probability values and data value rules based on the determined data value patterns, such that the linked data nodes 118, and test data generated therefrom, accurately reflect the data patterns of the real data 120. For instance, if the real data 120 includes a pattern of 30% department store transactions, 20% grocery store transactions, and 50% other transaction types, the linked data node generator 104 may generate linked data nodes 118 that include a first linked data node with a probability value of 30% and a data value rule that generates department store transactions, a second linked data node with a probability value of 20% and a data value rule that generates grocery store transactions, and one or more other linked data nodes that include a combined probability value of 50% and data value rules that generate transactions of other types (e.g., electronic store transactions, hardware store transactions, online shopping transactions, etc.).

The data node collapsing module 106 may include hardware, firmware, and/or software components that are configured to collapse or otherwise combine the linked data nodes 118 into combined data nodes 122 as described. The linked data nodes 118 may include a hierarchical structure or other structure (e.g., a tree structure as illustrated in FIG. 2A, etc.) that may be collapsed to consolidate or otherwise combine related data value rules of the linked data nodes. The collapsing of the linked data nodes 118 by the data node collapsing module 106 yields the combined data nodes 122. The combined data nodes 122 may each include a combined probability value and a set of combined data value rules. The combined probability value of a particular combined data node 122 may be based on the probability values of all of the linked data nodes that were collapsed into the combined data node. Similarly, the combined data value rules may include data value rules of the linked data nodes that were collapsed into the combined data node. In some examples, the linked data nodes 118 are linked in a hierarchical structure, and the data value rules of the linked data nodes 118 range from broad data value rules (e.g., an account code value of eight randomly generated numeric values is generated, etc.) to more specific data value rules (e.g., an account code value of eight numeric values is generated where the first four values are defined and the last four values are randomly generated, etc.). Collapsing the linked data nodes 118 into combined data nodes 122 may include combining the broader data value rules of the upper linked data nodes of the hierarchical structure into the more specific data value rules of the lower linked data nodes of the hierarchical structure. An example of the process is described in greater detail below with respect to FIGS. 2A and 2B.

The test data generator 110 may include hardware, firmware, and/or software components that are configured to generate a test data structure instance 124 and associated test data 126 as described. In some examples, each combined data node 122 includes combined data value rules that are configured to generate each data field 116 of a test data entry. Further, the set of combined data nodes 122 includes probability values that sum to 1 or 100%. Thus, the probability values of the combined data nodes 122 define the percentage or rate at which a particular combined data node 122 is used to generate a test data entry during test data generation by the test data generator 110. The test data generator 110 may be configured to generate a random and/or pseudo-random value using a random number generator and, based on the generated value, select a combined data node 122. In some examples, a random or pseudo-random value may be generated using computation-based pseudorandom number generator (e.g., a linear congruent al generator (LEG) that generates a series of pseudorandom values using a provided seed value, etc.), but it should be understood that the random value may also be generated using any method of random or pseudorandom number generation (e.g., random value generation based on physical phenomena that are expected to be random, such as atmospheric noise, etc.) as would be understood by a person of ordinary skill in the art without departing from the description herein.

The data value rules of the combined data node 122 are then evaluated to generate a test data entry of the test data 126. For instance, a set of combine data nodes 122 may include a first combined data node with a probability value of 40% and a second combined data node with a probability value of 60%. The test data generator 110 may generate a random value of 0.25, where random values between 0.00 and 0.40 select the first combined data node and random values between 0.41 and 0.99 select the second combined data node. The first combined data node is selected and the data value rules of the first combined data node are evaluated to generate a test data entry.

In some examples, the test data generator 110 is configured to generate a test data structure instance 124 based on the data fields 116 of the data structure 114. The test data generator 110 may create the test data structure instance 124 on a data store of the computing device 102 or on a data store separate from the computing device 102. In some instances, the test data generator 110 may be configured to generate multiple test data structure instances 124 based on requirements for test data that may be provided by a user.

The test data generator 110 may be configured to generate a plurality of data entries in order to populate the test data structure instance 124. For instance, the test data generator 110 may be instructed by a user to create a set number of test data 126 entries in the test data structure instance 124 (e.g., 1000 entries, 10,000 entries, 100,000 entries, etc.). By applying the data value rules of the combined data nodes 122 based on the associated probability values, the generated test data 126 reflects randomly generated test data values that are within the limitations defined by the data value rules (e.g., data entries may include randomly generated values, but the number of different types of transaction entries match the defined rules, and/or the state and zip code data values of each entry match, etc.).

In some examples, data value rules, when evaluated by the test data generator 110, cause a specific value to be generated (e.g, a data value rule that, when evaluated, generates a state code value for Missouri (MO), etc.). Alternatively, or additionally, the data value rules may cause the generation of data values from a list or set of possible values (e.g., a data value rule that generates an area code from the list of area codes associated with a state, etc.). Further, data value rules may cause the generation of data values based on a defined process (e.g., a process for generating credit account numbers that are realistic but are evaluated to ensure that the generated numbers never represent a real credit account, etc.).

In some examples, the test data generator 110 includes a plurality of generator components that are configured for generating specific types of data values a constant number generator, a constant string generator, a current date value generator, a key value-based list generator, a random string generator, a random numeric value generator, a random account number generator, a random date value generator, etc.). Data value rules may be configured to cause the test data generator 110 to make calls to one or more of the specific generator components. Exemplary pseudo-code of a data value rule is shown below.

```
{
    "name":"ConstantNumberGenerator",
    "properties":[{"name":"value","value":10}],
    "field": "MATCH_LVL_NUM"
}
```

In the above example, a data value rule for generating a constant number value of 10 for a data field called "MATCH_LVL_NUM" is shown. A test data generator 110 may interpret the example based on the name of the specific generator (e.g., "ConstantNumberGenerator", etc.) and the properties associated with the specific generator. Another example data value rule is shown below.

```
{
    "name":"KeyValuePickListGenerator",
    "parentfield":"TRAN_CURR_CD",
    "properties":[
        {"name":"keyvalues",
        "value": {
            "840":"2",
            "004":"2",
            "124":"2",
            "048":"3",
            "300": "0",
            "400": "3",
            "408": "2",
            "826": "2",
            "356": "2",
        }
        }
    ],
    "field": "TRAN_CURR_EXP"
}
```

The above example data value rule generates a data value from a list of possible data values based on a data value of another field upon which the associated data field depends. In this case, the field for which the data value is generated is "TRAN_CURR_EXP" and the field upon which that field depends is "TRAN_CURR_CD". The test data generator 110 may interpret this example data value rule by determining a generated test value of the "TRAN_CURR_CD" for the data entry first, and then using the list of keyed data values to generate a matching data value for "TRAN_CURR_EXP".

In some examples, the test data generator 110 is configured to generate data values using defined algorithms. For instance, the generation of realistic account numbers may require the use of a defined algorithm to ensure that the generated data values match the patterns of real account number and/or to ensure that an actual account number is not inadvertently used in a way that may place the real account at risk to fraud, etc. in an example, the test data generator 110 may be configured to use the Luhn algorithm or other similar checksum algorithms to validate that an account number generated for test data is not a real account number.

In some examples, the test data generator 110 and/or test generation system 100 generally is configured to generate data manipulation language (DML) commands to generate test data and/or populate a data structure instance with generated test data. An example of a command to generate DML command(s) is shown below.

```
java -jar DMLGenerator.jar [table name] [sequence
column] [sequence id] [record count] [strategy json
file] [file path]
```

In the above example command, a DMLGenerator.jar command is called to perform the generation of test data as described herein. The parameters provided to the command include a table name (e.g., the table for which test data will be generated based on the data fields of the table, etc.), a sequence column (e.g., a column that contains the primary key or sequence ID for the table, etc.), a sequence ID (e.g., the name of the sequence ID for the table, etc.), a record count (e.g., a number of test data entries to generate, etc.), a strategy JavaScript Object Notation (JSON) file (e.g., a name or link to a JSON file that includes the linked data nodes for test data generation, etc.), and a file path (e.g., an output file to which to write output of the process, etc.).

The test applications 112 may include hardware, firmware, and/or software components that are configured to execute or otherwise perform tests based on the test data 126 of the test data structure instance 124 as described. The test applications 112 may be configured to perform tests measuring performance of software based on the test data 126 and/or tests for verifying functionality of software based on the test data 126. For instance, a test application 112 may perform a test to determine the effectiveness of fraud detection software based on the generated test data 126. Alternatively, or additionally, a test application 112 may be configured to perform a test to determine the performance of software for encrypting and transferring the test data 126 to another location. It should be understood that test applications 112 may include any applications for testing the operation of hardware, firmware, and/or software based on generated test data 126 as would be understood by a person of ordinary skill in the art without departing from the description herein. In some examples, the test applications 112 may not be located on or otherwise associated with the computing device 102 and/or the system 100. Rather, the test data 126 of the test data structure instance 124 may be generated and provided for use by other test applications that are otherwise unassociated with the system 100.

Figure 2B:
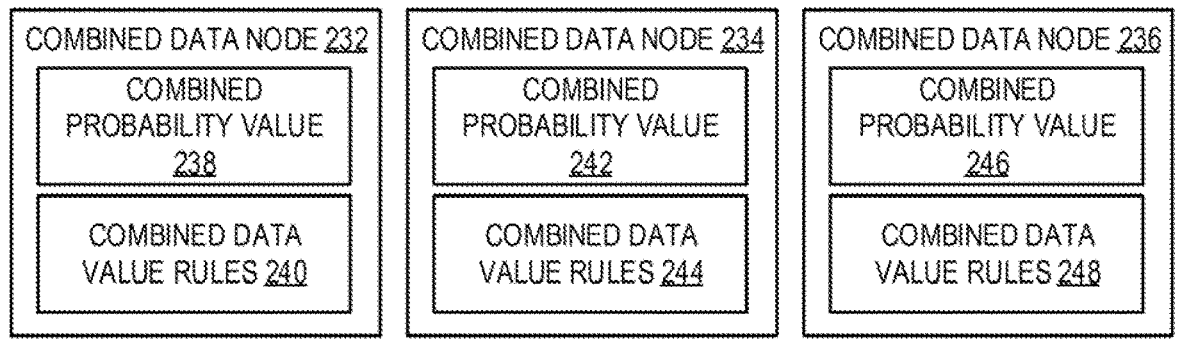

FIGS. 2A and 2B are exemplary block diagrams illustrating a tree structure 200 of linked data nodes and a set of combined data nodes 200', respectively, according to an embodiment. The linked data nodes 202-210 may be generated and populated with data by a linked data node generator component (e.g., linked data node generator 104, etc.) as described herein. Each data node 202-210 is linked to other data nodes as illustrated by the connecting lines. A first data node may be linked to a second data node as a parent node to the second data node or as a child node to the second data node. For instance, the root data node 202 is a parent node to the leaf data node 204 and the branch data node 206, while the leaf data node 208 and leaf data node 210 are child nodes to the branch data node 206. When a first data node is a parent node of a second data node, the second data node is a child node of the first data node.

Data nodes in a tree structure as shown in FIG. 2A may further be classified as root data nodes, branch data nodes, or leaf data nodes. The terms "root", "branch", and "leaf" indicate a relative location of the data node in the hierarchy of data nodes in the associated tree structure. A root data node (e.g., root data node 202, etc.) is a data node that has no parent node, such that it is disposed at the top of the tree hierarchy relative to other data nodes. In most examples, the root data node has one or more child nodes. However, in sonic cases, the root data node may have no child nodes, such that it is the only node in the tree hierarchy. A branch data node (e.g., branch data node 206, etc.) is a data node that has a parent node and one or more child nodes, such that it is disposed in the middle of the tree hierarchy relative to other data nodes. A leaf data node (e.g., leaf data nodes 204, 208, and 210, etc.) is a data node that has a parent node but no child nodes, such that it is disposed at the bottom of the tree hierarchy relative to other data nodes.

In some examples, each data node in the tree structure includes a probability value and at least one data value rule as described herein. Further, child nodes inherit data value rules from associated parent nodes. For instance, branch data node 206 may include a data value rule 222 that generates a state location code indicating that the associated transaction occurred in Missouri, Leaf data node 208 and Leaf data node 210 may each inherit the data value rule such that data value rules 226 and data value rules 230 also include a data value rule that generates a state location code indicating that the associated transaction occurred in Missouri. In some instances, a node, such as a root data node or a branch data node, may have no associated data value rules so long as the node has at least one child node with a defined data value rule.

Further, inheritance of data value rules from parent node to child node may include changes to the inherited data value rules that increase the specificity of the data values generated thereby. For instance, the branch data node 206 may include a data value rule that generates a zip code indicating that the associated transaction occurred in a zip code of the set of zip codes in the state of Missouri. The zip code data value rule of the branch data node 206 may be inherited by the leaf data node 208 and the leaf data node 210, and the data value rules 226 and data value rules 230 may include inherited zip code rules that have been modified to reduce the set of zip codes that will be generated (e.g., the data value rules 226 include a zip code data value rule that generates a first Missouri zip code, the data value rules 230 include a zip code data value rule that generates a second Missouri zip code, and the branch data node 206 has additional child data nodes that include data value rules for generating each other Missouri zip code, etc.). Some data value rules may be inherited across multiple links (e.g., a data value rule of data value rules 214 of root data node 202 is inherited by the data value rules 222 of branch data node 206 and further inherited from the data value rules 222 by the data value rules 226 and data value rules 230 of leaf data node 208 and leaf data node 210 respectively, etc.).

The probability values of the data nodes indicate a probability of the associated data value rules being evaluated relative to the parent node and any other child nodes of the parent node. For instance, in an example where root data node 202 has only the two illustrated child nodes, leaf data node 204 may have a probability value 216 of 20% and branch data node 206 may have a probability value 220 of 80%. The probability values indicate that, during test data generation, the data value rules 218 of leaf data node 204 are used to generate test data 20% of the time while the data value rules 222 of the branch data node 206 are used to generate test data 80% of the time. Additionally, leaf data node 208 may include a probability value 224 of 70% and the leaf data node 210 may include a probability value 228 of 30%, indicating, that, when the branch data node 206 is used to generate test data, the data value rules 226 of leaf data node 208 are used 70% of the time and the data value rules 230 of the leaf data node 210 are used 30% of the time. This described relationship between the probability values of the data nodes is reflected during the collapsing process described below with respect to FIG. 2B.

FIG. 2B illustrates a set of combined data nodes 200' that result from collapsing the tree structure 200 of FIG. 2A. The collapsing process may be executed by a data node collapsing module (e.g., data node collapsing module 106, etc.) as described herein. Each combined data node includes the combined probability value and combined data value rules of a path down the tree structure 200 from root data node 202 down to each leaf node. For instance, combined data node 232 includes the combined probability value 238 and combined data value rules 240 of root data node 202 and leaf data node 204. Further, combined data node 234 includes the combined data of root data node 202, branch data node 206 and leaf data node 208 and combined data node 236 includes the combined data of root data node 202, branch data node 206, and leaf data node 210.

Because probability values of data nodes indicate a probability relative to the associated parent node, combined probability values may be calculated by multiplying the probability values of all data nodes along the associated path from root node to leaf node. For instance, using the probability values in the example above, the combined probability value 238 of combined data node 232 is 20% (e.g., the probability value 212 is 100% and the probability value 216 is 20%; 100%×20%=20%, etc.). Further, the combined probability value 242 of combined data node 234 is 56% (e.g., the probability value 212 is 100%, the probability value 220 is 80%, and the probability value 224 is 70%; 100%×80%×70%=56%, etc.) and the combined probability value 246 of combined data node 236 is 24% (e.g., the probability value 212 is 100%, the probability value 220 is 80%, and the probability value 228 is 30%×100%×80%× 30%=24%, etc.).

The combined data value rules of the combined data nodes include the data value rules of the associated leaf data node and all of the inherited data value rules from data nodes along the path from root data node to leaf data node (e.g., combined data value rules 244 includes the data value rules 226 and data value rules inherited from data value rules 222 and data value rules 214. As described above, in some examples, the inherited rules from parent nodes are specified by associated data value rules of child nodes, such that the inherited data value rules may be overwritten by the more specific data value rules of the child nodes (e.g., a data value rule of a parent node that indicates a country code of the data entry is one of a list of available country codes may be overwritten by a data value rule of a child node that indicates a country code of the data entry is a defined country code, etc.).

In some examples, each combined data node (e.g., combined data nodes 232, 234, and 236, etc.) includes combined data value rules that are configured to generate data values for all of the data fields (e.g., data fields 116, etc.). Thus, when a combined data node is selected during test data generation, the combined data value rules may be evaluated to generate data values for all of the data fields as described herein.

Figure 3:
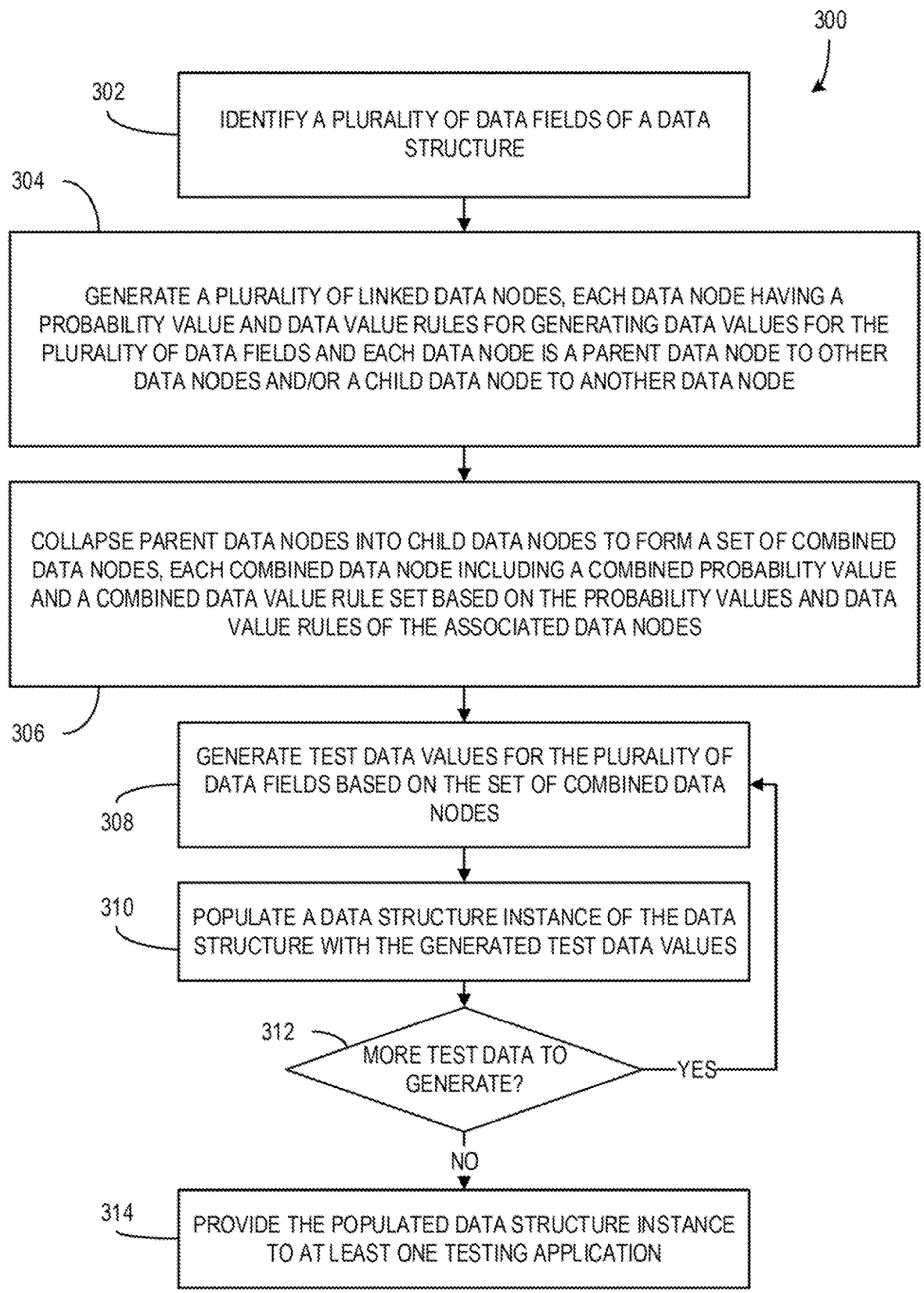
FIG. 3 is an exemplary flow chart illustrating generating test data based on a set of combined data nodes according to an embodiment.

FIG. 3 is an exemplary flow chart 300 illustrating generating test data based on a set of combined data nodes according to an embodiment. In some examples, the operations described in flow chart 300 may be performed by system 100 of FIG. 1 or other similar systems. At 302, a plurality of data fields of a data structure is identified. In some examples, the data structure is a relational database or other table-based database and the data fields are columns of one or more tables in the database. The data fields may include code values, index values, numeric values, string values, etc, Data fields may be defined to include ranges of possible values (e.g., a numeric field with values between 0 and 10, etc.) and/or lists of possible values (e.g., a category field with values from a list of 5 different category values, etc.). Identifying the plurality of data fields may include communicating with an interface associated with the data structure to request or otherwise retrieve the data fields and/or receiving data field information from a user via a user interface.

At 304, a plurality of linked data nodes is generated. Each data node comprises a probability value and at least one data value rule for generating a data value for at least one of the plurality of data fields. Each data node is at least one of a parent data node to at least one other data node of the plurality of linked data nodes or a child node to another data node of the plurality of linked data nodes. In some examples, the linked data nodes may be generated in a tree structure as described above with respect to the tree structure 200 of FIG. 2A above. The probability values of the linked data nodes indicate a probability that the associated at least one data value rule will be used to generate test data during test data generation. The generation of the plurality of linked data nodes may be performed by a linked data node generator (e.g., linked data nod generator 104, etc.) based on analysis of real data and determination of data patterns therein. Alternatively, or additionally, linked data nodes may be generated by input from a user.

At 306, the parent data nodes are collapsed into associated child data nodes to form a set of combined data nodes. Each combined data node includes a combined probability value based on probability values of associated parent data nodes and child data nodes and a combined data value rule set based on the at least one data value rules of the associated parent data nodes and child data nodes. In some examples, the collapsing operation is performed by a data node collapsing module (e.g., data node collapsing module 106, etc.). Combined data nodes may be based on collapsing paths of data nodes from a root data node to leaf data nodes into single nodes as described above. The combined probability values of combined data nodes may be calculated by multiplying the probability values of the data nodes from which the combined data nodes are formed (e.g., the data nodes along the path of nodes from the root data node to the leaf data node associated with the combined data node, etc.). The combined data value rule sets may be created by combining the data value rules of the data nodes from which the combined data nodes are formed. Further, the combined data value rule sets may include data value rules inherited by child nodes from parent nodes and/or inherited data value rules that are overwritten by more specific versions in the inheriting child nodes.

At 308, test data values are generated for the plurality of data fields based on the set of combined data nodes. The test data values may be generated by a test data generator component (e.g., test data generator 110, etc.). In some examples, the test data is generated using data value rules of the combined data nodes and based on the probability values of the combined data nodes as described herein. In an example where many data entries are generated, the probability value of a combined data node establish the fraction of generated test data that is generated based on the data value rules of the associated combined data node. The type of test data generated is dependent on the data fields with which the data value rules are associated and may include, for instance, code data values, index data values, other numeric values, string data values, and other specific data types, such as location data, date time data, etc.

At 310, a data structure instance of the data structure is populated with the generated test data values. In some examples, the data structure instance is separate from the data structure on which it is based, and the structural elements of the data structure, such as the data fields of the data structure, are copied to the data structure instance. For instance, the data structure instance may include a copied set of tables from a relational database that are empty of data entries. Populating the data structure instance may include inserting, or otherwise injecting the generated test data into the data structure instance as data entries in the tables of the database. In some examples, the data structure instance may be populated using commands of a data manipulation language (DML) such as structured query language (SQL).

If, at 312, there is more test data to generate, the process returns to 308 to generate additional test data. Alternatively, if there is no more test data to generate at 312, the populated data structure instance is provided to at least one testing application at 314. In some examples, providing the populated data structure instance includes putting the data structure instance in an environment that can be accessed by other applications, such as testing applications. Alternatively, or additionally, testing applications may be directly contacted or otherwise interacted with to provide access instructions for the data structure instance. The testing applications may use the test data in the populated data structure instance to test performance of applications in a realistic data environment. For instance, test applications may test fraud detection, data processing, or the like.

Figure 4:
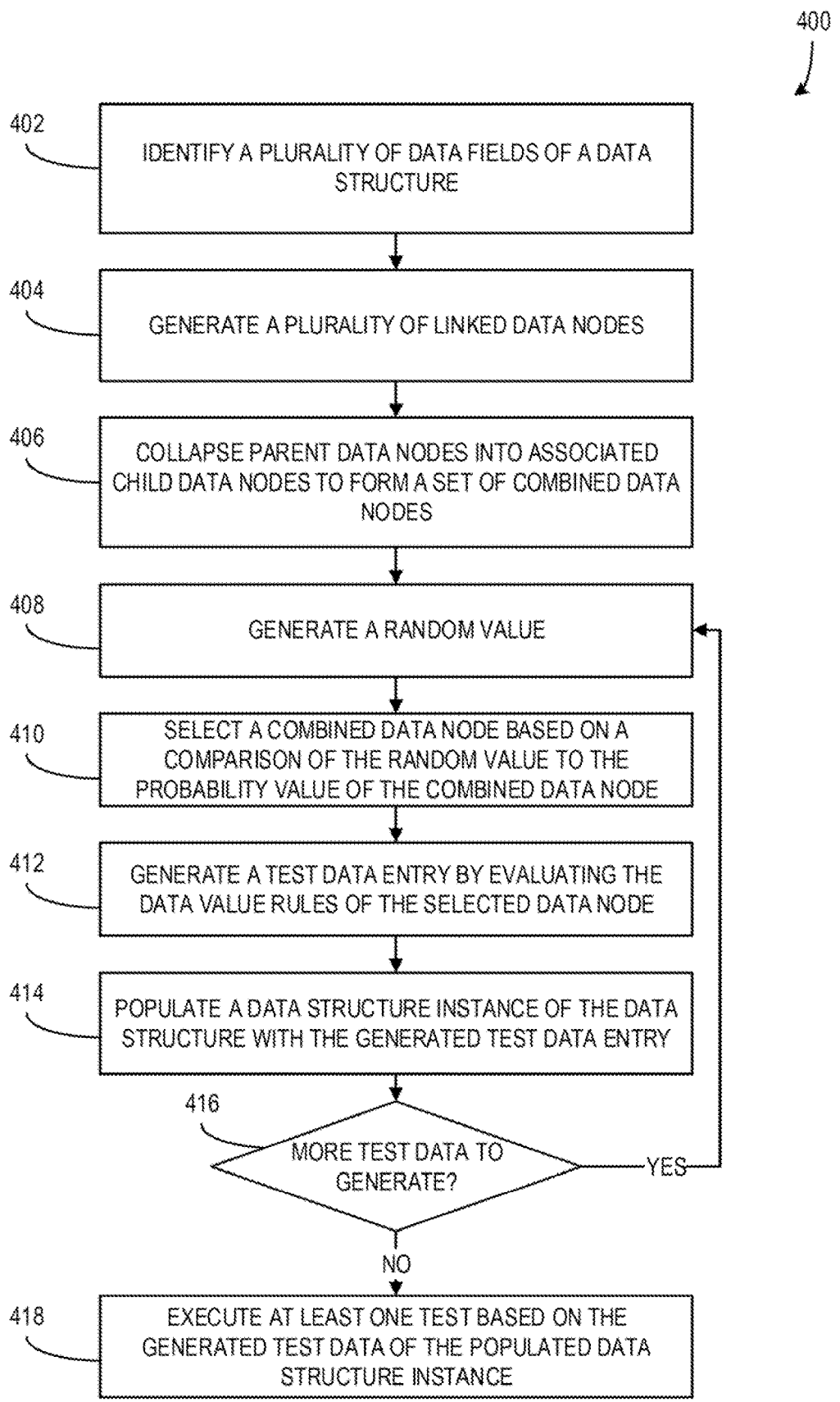
FIG. 4 is an exemplary flow chart illustrating generating test data and executing tests based on the generated test data according to an embodiment.

FIG. 4 is an exemplary flow chart 400 illustrating generating test data and executing tests based on the generated test data according to an embodiment. In some examples, the operations described in flow chart 400 may be performed by system 100 of FIG. 1 or other similar systems. From 402 to 406, the data fields are identified, and the linked data nodes are generated and collapsed as described above with respect to FIG. 3. At 408, a random value is generated. In some examples, the random value may be generated by a random number generator component as would be understood by a person of ordinary skill in the art. The generated random number may include a quantity of significant figures that match the granularity of the probability values of the set of combined data nodes (e.g., if the probability values of the combined data nodes include percentage values including a tenth of a percent value (e.g., 25.3%, etc.), the random value is generated as a percentage value including, a tenth of a percent value, etc.).

At 410, a combined data node of the set of combined data nodes is selected based on a comparison of the random value to the probability value of the combined data node. In some examples, each combined data node is assigned a range of possible random values based on the associated probability value (e.g., a combined data node with a probability value of 10% is assigned a range of possible random values that includes 10% of the total possible random values, etc.). The generated random value is compared to the assigned range of each combined data node and, when the generated random value matches the assigned range of a combined data node, that combined data node is selected.

At 412, the data value rules of the selected data node are evaluated to generate a test data entry. In some examples, the selected data node includes data value rules that generate at least one data value for each data field, such that when the data value rules of a data node are evaluated, a complete data entry with fully populated data fields is generated. The generation of the test data values of the test data entry may be performed in a substantially similar manner as described above with respect to the description of FIG. 1 and FIG. 3. Further, at 414, a data structure instance of the data structure is populated with the generated test data entry in a substantially similar manner as described above with respect to FIG. 3.

At 416, if there is more test data to generate, the process returns to 408. Alternatively, if there is no more test data to generate, at least one test is executed based on the generated test data of the populated data structure instance 418. In some examples, test data entries may be generated in large batches (e.g., 10,000 data entries, 100,000 data entries, etc.) such that the tests executed on the test data structure instance are applied to a set of data entries that effectively simulates the scale of a real data set.

The test or tests executed at 418 may be substantially similar to the test described above. In some examples, the component or device that generates the test data may execute the test or otherwise directly cause the tests to be executed upon the test data being generated. For instance, a test data generator component (e.g., test data generator 110, etc.) may be configured to initiate or otherwise communicate with a defined set of test applications upon complete generation of the test data.

Additional Example Scenarios

Aspects of the disclosure enable various additional scenarios, such as next described.

In an example, a data structure that stores account identifier data and associated location data indicating the location of the primary owners of the identified accounts. The data fields of the data structure include an account identifier field that is defined as an 8-digit numeric value, a country identifier field that is a 2-letter country code value (e.g., CA for Canada, US for the United States of America (USA), etc.), and a territory identifier field that identifies a state, province, or other sub-area of a country using a 4-digit code value.

A test data generation system is used to generate a set of linked data nodes in a tree structure that define the probabilities of generating the various possible test data values as described herein. The root node of the linked data nodes has a probability value of 100% and has generic data value rules for generating data values for each of the three data fields. For instance, a first data value rule generates a random 8-digit numeric value for an account identifier based on a defined account identifier algorithm. A second data value rule generates a random country code value from a defined list of possible country codes that includes at least CA for Canada and US for the USA. A third data value rule generates a random territory identifier value from a list of possible territory identifier values that includes all territories of Canada and the USA.

The tree structure further includes two child nodes of the root node. The first child node has a probability value of 20% and data value rules for generating data values for the data fields. A first data value rule is inherited from the root node and generates a random 8-digit numeric value for an account identifier based on a defined account identifier algorithm. The account identifier data value rule is modified to generate account identifier values that are specific to accounts in Canada. A second data value rule generates the 2-letter country code for Canada. A third data value rule generates a random territory identifier value from a list of possible territory identifier values that includes all territories in Canada. This child node is configured to generate test data that is specific to accounts of users in Canada at a rate of 20% of the time.

The second child node of the root node has a probability value of 80% and has similar data value rules that are configured to generate data values for the data fields that are specific to the USA. The second child node of the root node is a branch node and further includes two child nodes.

The first child node of the branch node has a 70% probability value and has data value rules that generate data values for the data fields that are specific to a first territory of the USA. For instance, a data value rule that generates an account identifier value is configured to generate an account identifier that includes a defined prefix of four digits that is specific to the territory. Further, a second data value rule is defined that generates a country code for the USA, which is directly inherited from the branch node. A third data value rule generates a territory identifier value that is specific to the territory with which the first child node is associated.

The second child node of the branch node has a 30% probability value and has data value rules similar to the first child node, but that generate data values that are specific to a second territory of the USA. For instance, an account identifier generated by the second child node may include a different four-digit prefix and a territory identifier value generated by the second child node may be a defined territory identifier code of the associated territory.

After the tree structure of linked data nodes is generated, the test data generation system collapses the linked data nodes into combined data nodes as described herein. The probability values of the data nodes in each path through the tree structure from the root node to a leaf node are multiplied to calculate the combined probability value of the associated combined data nodes (e.g., a combined data node is created during the collapsing process for each leaf node of the tree structure, etc.). Further, the data value rules of the data nodes in each path through the tree structure from the root node to a leaf node are combined in each associated combined data node. The resulting data value rules of the combined data nodes include data value rules for generating data values associated with accounts located in Canada (e.g., the data value rules of the first child node of the root node described above, etc.), data value rules for generating data values associated with accounts located in the first territory of the USA (e.g., the data value rules of the first child node of the branch node described above, etc.), and data value rules for generating data values associated with accounts located in the second territory (e.g., the data value rules of the second child node of the branch node described above, etc.).

After the combined data nodes are created via the collapsing process, the test data generation system generates data values and populates a data structure instance with the generated data values as described herein. The test data generation system generates 10,000 data entries and inserts the test data in an empty data structure instance configured according to the data structure to be tested. The generated test data entries include approximately 20% account data entries associated with accounts located in Canada, approximately 56% account data entries associated with accounts located in the first territory of the USA, and approximately 24% account data entries associated with accounts located in the second territory of the USA. The test data generation system repeatedly generates random number values using a random number generator and selects a combined data node for use in generating a test data entry based on the generated random number value for each test data entry. The populated data structure instance is then provided for use by one or more test applications by storing the populated data structure instance in an accessible testing environment.

Exemplary Operating Environment

Figure 5:
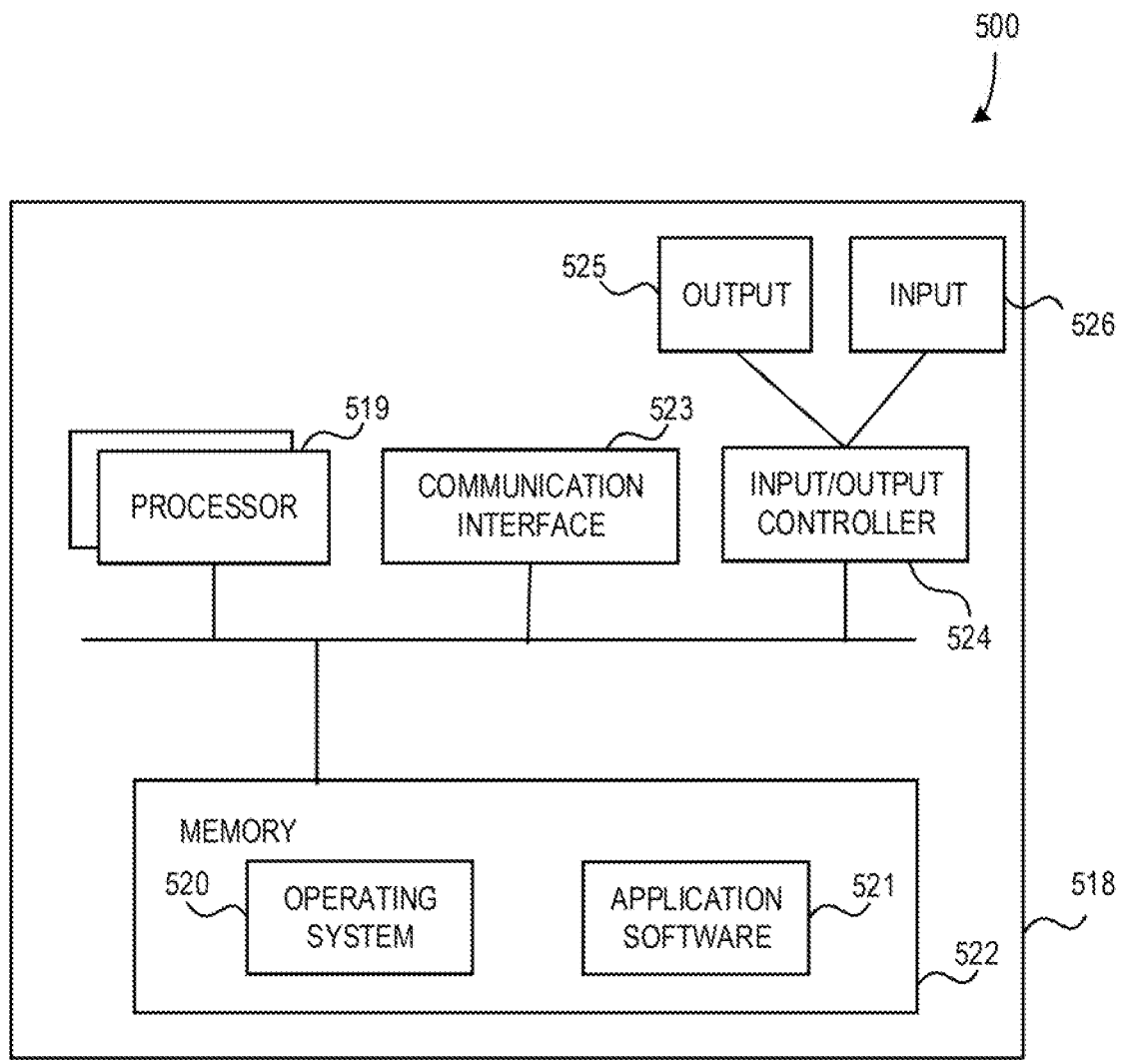
FIG. 5 illustrates a computing apparatus according to an embodiment as a functional block diagram.

The present disclosure is operable with a computing apparatus according to an embodiment as a functional block diagram 500 in FIG. 5. In an embodiment, components of a computing apparatus 518 may be implemented as a part of an electronic device according to one or more embodiments described in this specification. The computing apparatus 518 comprises one or more processors 519 which may be microprocessors, controllers or any other suitable type of processors for processing computer executable instructions to control the operation of the electronic device. Platform software comprising an operating system 520 or any other suitable platform software may be provided on the apparatus 518 to enable application software 521 to be executed on the device. According to an embodiment, generating test data based on data value rules of linked data nodes as described herein may be accomplished by software.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone or a touchpad. In one embodiment, the output device 525 may also act as the input device. An example of such a device may be a touch sensitive display. The input/output controller 524 may also output data to devices other than the output device, e.g. a locally connected printing device. In some embodiments, a user may provide input to the input device(s) 526 and/or receive output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific integrated Circuits (ASICs), Program-specific Standard Products (ASSPs), System-on-a-chip systems (SOCs), Complex Programmable Logic Devices (CPLDs). Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for generating test data comprising:
at least one processor; and
at least one memory comprising computer program code, the at least one memory and the computer program code configured to, with the at least one processor, cause the at least one processor to:
identify a plurality of data fields of a data structure;
generate a plurality of linked data nodes, wherein each data node comprises a probability value and at least one data value rule for generating a data value for at least one of the plurality of data fields, and wherein each data node is at least one of a parent data node to at least one other data node of the plurality of linked data nodes or a child data node to another data node of the plurality of linked data nodes;
collapse parent data nodes into associated child data nodes to form a set of combined data nodes, wherein each combined data node includes a combined probability value based on probability values of associated parent data nodes and child data nodes and a combined data value rule set based on the at least one data value rules of the associated parent data nodes and child data nodes;
generate test data values for the plurality of data fields based on the set of combined data nodes;
populate a data structure instance of the data structure with the generated test data values; and
provide the populated data structure instance for use by at least one testing application.
wherein a generated test data value based on at least one data value rule of a child data node is dependent on a data value generated based on at least one data value rule of a parent data node of the child data node.
wherein a data value rule of a first data node indicates that a data value from a list of possible data values be generated and, for each data value of the list of possible data values, a child node of the first data node includes a data value rule indicating that the data value be generated.
wherein data value rules of the plurality of linked data nodes include at least one of data value rules for generating code values, data value rules for generating location data values, data value rules for generating string values, data value rules for generating ranges of values, or data value rules for generating lists of values.

wherein the generated plurality of linked data nodes comprises a tree structure of the linked data nodes, the tree structure including:
a root data node, wherein the root data node is a parent node to at least one other data node of the plurality of linked data nodes and not a child node to another data node of the plurality of linked data nodes;
a plurality of branch data nodes, wherein each branch data node is a parent node to at least one other data node of the plurality of linked data nodes and a child node to another data node of the plurality of linked data nodes; and
a plurality of leaf data nodes, wherein each leaf data node is a child node to another data node of the plurality of linked data nodes and not a parent node to another data node of the plurality of linked data nodes.

wherein the set of combined data nodes includes a combined data node for each leaf data node of the tree structure of linked data nodes; and wherein collapsing parent data nodes into associated child data nodes includes collapsing, for each leaf data node, a path of parent nodes from the root data node to the parent data node of the leaf data node into the leaf data node to form an associated combined data node.

wherein the combined data value rule set for each combined data node includes inherited data value rules from each parent node of the path of parent nodes, wherein each combined data node includes data value rules for generating values for each data field of the plurality of data fields; and wherein generating test data values for the plurality of data fields includes selecting a combined data node based on a result of a random number generator and generating test data values for each data field of the plurality of data fields based on the data value rules of the selected combined data node.

A computerized method for generating test data, the method comprising: identifying a plurality of data fields of a data structure;

generating a plurality of linked data nodes, wherein each data node comprises a probability value and at least one data value rule for generating a data value for at least one of the plurality of data fields and wherein each data node is at least one of a parent data node to at least one other data node of the plurality of linked data nodes or a child data node to another data node of the plurality of linked data nodes;

collapsing parent data nodes into associated child data nodes to form a set of combined data nodes, wherein each combined data node includes a combined probability value based on probability values of associated parent data nodes and child data nodes and a combined data value rule set based on the at least one data value rules of the associated parent data nodes and child data nodes;

generating, by a processor, test data values for the plurality of data fields based on the set of combined data nodes;

populating, by the processor, a data structure instance of the data structure with the generated test data values; and executing at least one test on the populated data structure instance, whereby at least one test result is produced based on the generated test data values.

wherein a generated test data value based on at least one data value rule of a child data node is dependent on a data value generated based on at least one data value rule of a parent data node of the child data node.

wherein a data value rule of a first data node indicates that a data value from a list of possible data values be generated and, for each data value of the list of possible data values, a child node of the first data node includes a data value rule indicating that the data value be generated, wherein data value rules of the plurality of linked data nodes include at least one of data value rules for generating code values, data value rules for generating location data values, data value rules for generating string values, data value rules for generating ranges of values, or data value rules for generating lists of values.

wherein the generated plurality of linked data nodes comprises a tree structure of the linked data nodes, the tree structure including:
a root data node, wherein the root data node is a parent node to at least one other data node of the plurality of linked data nodes and not a child node to another data node of the plurality of linked data nodes;
a plurality of branch data nodes, wherein each branch data node is a parent node to at least one other data node of the plurality of linked data nodes and a child node to another data node of the plurality of linked data nodes; and
a plurality of leaf data nodes, wherein each leaf data node is a child node to another data node of the plurality of linked data nodes and not a parent node to another data node of the plurality of linked data nodes.

wherein the set of combined data nodes includes a combined data node for each leaf data node of the tree structure of linked data nodes; and wherein collapsing parent data nodes into associated child data nodes includes collapsing, for each leaf data node, a path of parent nodes from the root data node to the parent data node of the leaf data node into the leaf data node to form an associated combined data node.

wherein the combined data value rule set for each combined data node includes inherited data value rules from each parent node of the path of parent nodes.

wherein each combined data node includes data value rules for generating values for each data field of the plurality of data fields; and wherein generating test data values for the plurality of data fields includes selecting a combined data node based on a result of a random number generator and generating test data values for each data field of the plurality of data fields based on the data value rules of the selected combined data node.

further comprising:
obtaining a data structure instance populated by a set of real data values;
identifying data value patterns in the set of real data values; and
generating the plurality of linked data nodes based on the identified data value patterns.

One or more computer storage media having computer-executable instructions for generating test data that, upon execution by a processor, cause the processor to at least:
identify a plurality of data fields of a data structure;
generate a plurality of linked data nodes, wherein each data node comprises a probability value and at least one data value rule for generating a data value for at least one of the plurality of data fields, and wherein each data node is at least one of a parent data node to at least one other data node of the plurality of linked data nodes or a child data node to another data node of the plurality of linked data nodes;

collapse parent data nodes into associated child data nodes to form a set of combined data nodes, wherein each combined data node includes a combined probability value based on probability values of associated parent data nodes and child data nodes and a combined data value rule set based on the at least one data value rules of the associated parent data nodes and child data nodes;

generate test data values for the plurality of data fields based on the set of combined data nodes:

populate a data structure instance of the data structure with the generated test data values; and execute at least one test on the populated data structure instance, whereby at least one test result is produced based on the generated test data values, wherein a data value rule of a first data node indicates that a data value from a list of possible data values be generated and, for each data value of the list of possible data values, a child node of the first data node includes a data value rule indicating that the data value be generated.

The one or more computer storage media of claim 18, wherein each combined data node includes data value rules for generating values for each data field of the plurality of data fields; and wherein generating test data values for the plurality of data fields includes selecting a combined data node based on a result of a random number generator and generating test data values for each data field of the plurality of data fields based on the data value rules of the selected combined data node.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means identifying a plurality of data fields of a data structure, means for generating a plurality of linked data nodes, wherein each data node comprises a probability value and at least one data value rule for generating a data value for at least one of the plurality of data fields, and wherein each data node is at least one of a parent data node to at least one other data node of the plurality of linked data nodes or a child data node to another data node of the plurality of linked data nodes, means for collapsing parent data nodes into associated child data nodes, wherein each combined data node includes a combined probability value based on probability values of associated parent data nodes and child data nodes and a combined data value rule set based on the at least one data value rules of the associated parent data nodes and child data nodes, means for generating test data values for the plurality of data fields based on the set of combined data nodes, means for populating a data structure instance of the data structure with generated test data values, and means for providing the populated data structure instance for use by at least one testing application. The illustrated one or more processors 519 together with the computer program code stored in memory 522 constitute exemplary processing means for generating linked data nodes, collapsing linked data nodes into combined data nodes, and generating test data based on the combined data nodes as described herein.

The term "comprising" is used in this specification to mean including the featurer(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for generating test data comprising:
a computing device that includes a hardware processor; and a hardware memory associated with the computing device, the hardware memory comprising computer program code, the hardware memory and the computer program code configured to, with the hardware processor, cause the hardware processor to:

identify a plurality of data fields of a data structure;

generate a plurality of linked data nodes, wherein each data node comprises a probability value and at least one data value rule for generating a data value for at least one of the plurality of data fields, and wherein each data node is one or more of (1) a parent data node to at least one other data node of the plurality of linked data nodes and (2) a child data node to another data node of the plurality of linked data nodes;

collapse parent data nodes into associated child data nodes to form a set of combined data nodes, wherein each combined data node includes a combined probability value based on (1) probability values of associated parent data nodes and child data nodes and (2) a combined data value rule set based on the at least one data value rule of the associated parent data nodes and child data nodes, wherein the combined data value rule set for each combined data node includes inherited data value rules from each parent node of a path of parent nodes from a root data node to a parent data node of a leaf data node of the plurality of linked data nodes;

generate test data values for the plurality of data fields based on the set of combined data nodes;

populate a data structure instance of the data structure with the generated test data values; and provide the populated data structure instance to at least one testing application configured to perform tests based on the generated test data values in the populated data structure instance.

2. The system of claim 1, wherein a first generated test data value based on at least one data value rule of a first child data node is dependent on a data value generated based on at least one data value rule of a parent data node of the first child data node, the probability value of the combined data node indicating a percentage at which the combined data node is used to generate a test data value of the test data values.

3. The system of claim 1, wherein a data value rule of a first data node indicates that a data value from a list of possible data values be generated and, for each data value of the list of possible data values, a child data node of the first data node includes a data value rule indicating that the data value be generated.

4. The system of claim 1, wherein data value rules of the plurality of linked data nodes include at least one of data value rules for generating code values, data value rules for generating location data values, data value rules for generating string values, data value rules for generating ranges of values, or data value rules for generating lists of values.

5. The system of claim 1, wherein the generated plurality of linked data nodes comprises a tree structure of the linked data nodes, the tree structure including:

the root data node, wherein the root data node is a parent node to at least one other data node of the plurality of linked data nodes and not a child node to another data node of the plurality of linked data nodes;

a plurality of branch data nodes, wherein each branch data node is a parent node to at least one other data node of the plurality of linked data nodes and a child node to another data node of the plurality of linked data nodes; and a plurality of leaf data nodes, wherein each leaf data node is a child node to another data node of the plurality of linked data nodes and not a parent node to another data node of the plurality of linked data nodes.

6. The system of claim 5, wherein the set of combined data nodes includes a combined data node for each leaf data node of the tree structure of the linked data nodes; and wherein collapsing parent data nodes into associated child data nodes includes collapsing, for each leaf data node, the path of parent nodes from the root data node to the parent data node of the leaf data node into the leaf data node to form an associated combined data node.

7. The system of claim 1, wherein the test data values are generated in batches, and wherein the at least one testing application is configured to apply the tests to a set of the test data values.

8. The system of claim 1, wherein each combined data node includes data value rules for generating values for each data field of the plurality of data fields; and wherein generating test data values for the plurality of data fields includes selecting a combined data node based on a result of a random number generator and generating test data values for each data field of the plurality of data fields based on the data value rules of the selected combined data node.

9. A computerized method for generating test data, the method comprising:

identifying a plurality of data fields of a data structure;

generating a plurality of linked data nodes, wherein each data node comprises a probability value and at least one data value rule for generating a data value for at least one of the plurality of data fields, and wherein each data node is one or more of (1) a parent data node to at least one other data node of the plurality of linked data nodes and (2) a child data node to another data node of the plurality of linked data nodes;

collapsing parent data nodes into associated child data nodes to form a set of combined data nodes, wherein each combined data node includes a combined probability value based on (1) probability values of associated parent data nodes and child data nodes and (2) a combined data value rule set based on the at least one data value rule of the associated parent data nodes and child data nodes, wherein the combined data value rule set for each combined data node includes inherited data value rules from each parent node of a path of parent nodes from a root data node to a parent data node of a leaf data node of the plurality of linked data nodes;

generating, by a hardware processor associated with a computing device, test data values for the plurality of data fields based on the set of combined data nodes;

populating, by the hardware processor, a data structure instance of the data structure with the generated test data values; and executing at least one test on the populated data structure instance to produce at least one test result based on the generated test data values.

10. The computerized method of claim 9, wherein a first generated test data value based on at least one data value rule of a first child data node is dependent on a data value generated based on at least one data value rule of a parent data node of the first child data node.

11. The computerized method of claim 9, wherein a data value rule of a first data node indicates that a data value from a list of possible data values be generated and, for each data value of the list of possible data values, a child data node of the first data node includes a data value rule indicating that the data value be generated.

12. The computerized method of claim 9, wherein data value rules of the plurality of linked data nodes include at least one of data value rules for generating code values, data value rules for generating location data values, data value rules for generating string values, data value rules for generating ranges of values, or data value rules for generating lists of values.

13. The computerized method of claim 9, wherein the generated plurality of linked data nodes comprises a tree structure of the linked data nodes, the tree structure including:
    the root data node, wherein the root data node is a parent node to at least one other data node of the plurality of linked data nodes and not a child node to another data node of the plurality of linked data nodes;
    a plurality of branch data nodes, wherein each branch data node is a parent node to at least one other data node of the plurality of linked data nodes and a child node to another data node of the plurality of linked data nodes; and
    a plurality of leaf data nodes, wherein each leaf data node is a child node to another data node of the plurality of linked data nodes and not a parent node to another data node of the plurality of linked data nodes.

14. The computerized method of claim 13, wherein the set of combined data nodes includes a combined data node for each leaf data node of the tree structure of linked data nodes; and
    wherein collapsing parent data nodes into associated child data nodes includes collapsing, for each leaf data node, the path of parent nodes from the root data node to the parent data node of the leaf data node into the leaf data node to form an associated combined data node.

15. The computerized method of claim 9, wherein the probability value of the combined data node indicates a percentage at which the combined data node is used to generate a test data value of the test data values.

16. The computerized method of claim 9, wherein each combined data node includes data value rules for generating values for each data field of the plurality of data fields; and
    wherein generating test data values for the plurality of data fields includes selecting a combined data node based on a result of a random number generator and generating test data values for each data field of the plurality of data fields based on the data value rules of the selected combined data node.

17. The computerized method of claim 9, further comprising:
    obtaining a data structure instance populated by a set of real data values;
    identifying data value patterns in the set of real data values; and
    generating the plurality of linked data nodes based on the identified data value patterns.

18. One or more computer storage media having computer-executable instructions for generating test data that, upon execution by a hardware processor, cause the hardware processor to at least:
    identify a plurality of data fields of a data structure;
    generate a plurality of linked data nodes, wherein each data node comprises a probability value and at least one data value rule for generating a data value for at least one of the plurality of data fields, and wherein each data node is one or more of (1) a parent data node to at least one other data node of the plurality of linked data nodes and (2) a child data node to another data node of the plurality of linked data nodes;
    collapse parent data nodes into associated child data nodes to form a set of combined data nodes, wherein each combined data node includes a combined probability value based on (1) probability values of associated parent data nodes and child data nodes and (2) a combined data value rule set based on the at least one data value rule of the associated parent data nodes and child data nodes, wherein the combined data value rule set for each combined data node includes inherited data value rules from each parent node of a path of parent nodes from a root data node to a parent data node of a leaf data node of the plurality of linked data nodes;
    generate test data values for the plurality of data fields based on the set of combined data nodes;
    populate a data structure instance of the data structure with the generated test data values; and
    execute at least one test on the populated data structure instance to produce at least one test result based on the generated test data values.

19. The one or more computer storage media of claim 18, wherein a data value rule of a first data node indicates that a data value from a list of possible data values be generated and, for each data value of the list of possible data values, a child data node of the first data node includes a data value rule indicating that the data value be generated.

20. The one or more computer storage media of claim 18, wherein each combined data node includes data value rules for generating values for each data field of the plurality of data fields; and
    wherein generating test data values for the plurality of data fields includes selecting a combined data node based on a result of a random number generator and generating test data values for each data field of the plurality of data fields based on the data value rules of the selected combined data node.

* * * * *